United States Patent
Tunze et al.

(10) Patent No.: US 9,258,985 B2
(45) Date of Patent: Feb. 16, 2016

(54) CLEANING DEVICE

(71) Applicant: TUNZE Aquarientechnik GmbH, Penzberg (DE)

(72) Inventors: Felix Tunze, Penzberg (DE); Axel Tunze, Penzberg (DE)

(73) Assignee: TUNZE Aquarientechnik GmbH, Penzberg (DE)

( * ) Notice: Subject to any disclaimer, the term of this patent is extended or adjusted under 35 U.S.C. 154(b) by 0 days.

(21) Appl. No.: 14/630,769

(22) Filed: Feb. 25, 2015

(65) Prior Publication Data

US 2015/0237836 A1 Aug. 27, 2015

(30) Foreign Application Priority Data

Feb. 25, 2014 (DE) .......................... 10 2014 002 442

(51) Int. Cl.
| | |
|---|---|
| *A47L 1/09* | (2006.01) |
| *A01K 63/00* | (2006.01) |
| *A01K 61/00* | (2006.01) |
| *A47L 13/12* | (2006.01) |
| *A47L 13/42* | (2006.01) |

(52) U.S. Cl.
CPC .............. *A01K 63/006* (2013.01); *A01K 61/003* (2013.01); *A47L 1/09* (2013.01); *A47L 13/12* (2013.01); *A47L 13/42* (2013.01)

(58) Field of Classification Search
CPC ...... A01K 61/003; A01K 63/006; A47L 1/09; A47L 1/12
USPC .................. 15/220.2, 236.01, 236.02, 236.05, 15/236.06, 245; 119/264
See application file for complete search history.

(56) References Cited

U.S. PATENT DOCUMENTS

| | | | | |
|---|---|---|---|---|
| 5,515,570 A | * | 5/1996 | Muscroft .................. | A47L 1/12 15/210.1 |
| 2002/0112303 A1 | * | 8/2002 | Hanson ................ | A01K 61/003 15/220.2 |

FOREIGN PATENT DOCUMENTS

| | | | |
|---|---|---|---|
| DE | 91 05 938.0 U1 | | 8/1991 |
| JP | 9-289959 | * | 11/1997 |
| JP | 10-127533 | * | 5/1998 |
| JP | 2000-41905 | * | 2/2000 |
| WO | 2006/137813 | * | 12/2006 |

* cited by examiner

*Primary Examiner* — Mark Spisich
(74) *Attorney, Agent, or Firm* — Myers Wolin, LLC

(57) ABSTRACT

A cleaning device for cleaning the back side of a panel with a control member and a cleaning member, which is separate from the control member and which has a base member and two blades disposed thereon. The control member and the cleaning member interact magnetically through the panel, so that the cleaning member disposed on the back side of the panel can be guided along the panel while pressing the cleaning edges of both blades on the back side of the panel by means of the control member disposed in a manner corresponding to it on the front side of the panel. The two blades may be of different lengths and, by suitable geometry and arrangement of the blades or of magnetic elements, the shorter of the two blades exerts a greater pressing force on the panel with its cleaning edge than does the longer.

9 Claims, 2 Drawing Sheets

CLEANING DEVICE

CROSS REFERENCE TO RELATED APPLICATIONS

This application claims priority under 35 USC §119 to German Patent Application No. DE 10 2014 002 442.3 filed on Feb. 25, 2014, the contents of which are incorporated herein by reference.

FIELD OF THE INVENTION

The invention relates to a cleaning device for cleaning the back side of a panel, especially an aquarium panel.

BACKGROUND

The invention relates to a cleaning device for cleaning the back side of a panel, especially an aquarium panel, with a control member and a cleaning member, which is separate from the control member and which has a base member and two blades disposed at opposite ends of the base member, wherein the control member and the cleaning member can be made to interact magnetically through the panel by means of appropriately disposed magnetic elements, so that the cleaning member disposed on the back side of the panel can be guided along the panel while pressing the cleaning edges of both blades on the back side of the panel by means of the control member disposed in a manner corresponding to it on the front side of the panel.

Such cleaning devices are already sufficiently known from the prior art. Thus DE 9105938 U1, for example, discloses a cleaning device of the class in question for cleaning poorly accessible or inaccessible back sides of panels, especially aquarium panels, wherein at least two blades are mounted in the manner of knife edges on the cleaning member therein ("secondary part"), which by virtue of magnetic attraction is jointly moved with a control member ("primary part"), which can be guided manually on the front side of the panel. As regards the cleaning result achievable therewith, however, this cleaning device is not optimally adapted to the elimination of various kinds of panel soiling.

Against this background, the object of the present invention is to improve a cleaning device of the type mentioned in the introduction to the effect that panels can be cleaned as simply and quickly as possible with an improved cleaning result therewith even in the presence of different kinds of soiling of the back side of the panel, such as occurs in particular in aquariums.

SUMMARY

This object is achieved by a cleaning device according to the claims.

The inventive cleaning device is characterized not only by the features mentioned in the introduction but also by the fact that the two blades are of different lengths and, by suitable geometry and arrangement of the blades and/or of the magnetic elements, the shorter of the two blades exerts a greater pressing force on the panel with its cleaning edge than does the longer of the two blades.

Because of the fact that two blades of different lengths are used in the context of the present invention, wherein the shorter of the two blades exerts a greater pressing force against the back side of the panel to be cleaned with its cleaning edge than does the longer of the two blades (when the control and cleaning members are disposed as intended on the front and back sides of the panel), a particularly flexible and easy-to-operate cleaning device is obtained for removal of various types of soiling.

In particular, the longer of the two blades, which according to the invention exerts a smaller pressing force against the back side of the panel to be cleaned, can then be used to some extent for rapid rough elimination of light soiling from the back side of the panel by suitable movement of the cleaning member, while the shorter of the two blades, which exerts a greater pressing force against the back side of the panel, can be used for selective removal of obstinate soiling, which in any case is frequently necessary only for spot cleaning.

This proves to be especially advantageous in particular during use of an inventive cleaning device for cleaning the back side and insides of aquarium panels (disposed inside the aquarium and under water), since different kinds of soiling—as regards removability—are deposited there. They include in particular soiling that can be relatively easily removed, such as algae, which usually adhere loosely to the aquarium panel, but they also include more stubborn soiling, such as coralline algae, which usually adhere firmly to aquarium panels and therefore are more difficult to detach therefrom.

It is self-evident that the different pressing forces that the two blades (of different length) will be able to exert according to the invention against the panel to be cleaned can be established in different ways. In the simplest case, in an arrangement of the magnetic elements in the control and base members that pulls the two blades against the panel with (substantially) the same force, the pressing forces of different intensity can then be adjusted making the areas of contact between the respective blade edges and the panel of different size. The areas of contact of different size can then be obtained—for blade edges of otherwise identical geometry—by the different length of the blade edges of the blades, which in any case have different lengths. Furthermore, in the context of the present invention, it may be provided that the different pressing forces on the blades of different length will be adjusted or intensified by a suitably asymmetric arrangement and/or configuration of the magnetic elements in the control and/or cleaning members.

Suitable magnetic elements for use in an inventive cleaning device are sufficiently known from the prior art, but for reasons of simplicity the use of at least one permanent magnet disposed in or on the control member and/or cleaning member can in particular be considered, wherein it interacts with (at least) one permanent magnet and/or ferromagnetic material disposed to correspond thereto in the cleaning or control member to be disposed on the other side of the panel in order to achieve a suitable force of attraction.

According to a first advantageous configuration of the invention, it may be provided that the two blades are disposed on opposite sides of the base member of the cleaning member, wherein the two blades are pressed against the panel to be cleaned in such a way that their cleaning edges are parallel but respectively angled in mutually opposite directions.

Hereby particularly simple and intuitive operability of the inventive cleaning device is achieved, by the fact that the cleaning member simply has to be moved in opposite directions by means of the control member being moved (manually) over the front side of the panel in order to make efficient use of the different blades, in which case, for the purpose of rapid rough cleaning, the longer of the two blades—relative to the direction of movement of the cleaning member—points obliquely forward, whereas, for the purpose of easier removal of obstinate dirt, the cleaning member can be oriented and guided in such a way that the shorter of the two blades— relative to the direction of movement of the cleaning member—points obliquely forward.

A particularly preferred configuration of an inventive cleaning member provides that the cleaning edge of the shorter of the two blades forms a smaller area of contact with the panel to be cleaned than does the cleaning edge of the longer of the two blades. Hereby, as has already been explained in the foregoing, it can be ensured in particularly simple manner that the cleaning edges of the two blades exert pressing forces on the panel that are different in the sense according to the invention.

Although it is also conceivable in principle in the context of the present invention that the base member will bear against the panel to be cleaned with, for example, a cleaning sponge disposed between the two blades, it is advantageously provided in a particularly preferred improvement of the invention that the base member is spaced apart from the panel by at least 2 mm, more preferably by at least 3 mm, particularly preferably by approximately 3.5 to 4 mm while the cleaning edges of the two blades are bearing on the panel. Thus a gap of at least 2 mm in width is present between the surface to be cleaned, on which surface the contact faces of the blades of the panel bear, and the rest of the base member, so that, during use of the cleaning device, meaning when the blades are pressed in the inventive sense against the back side of an (aquarium) panel to be cleaned and the cleaning member is being moved over the panel, an appropriate minimum distance is always ensured between the base member and the back side of the panel to be cleaned. Hereby it can be ensured in particular that smaller particles, such as grains of sand or the like that have been swirled up, do not settle between the base member and the panel to be cleaned and then scratch this during displacement of the cleaning member. In this way the minimum distance between base member and panel can be chosen preferably as a function of the grain size of the bed of material provided in the respective aquarium.

Furthermore, cleaning of curved panels can also be achieved advantageously by appropriately spacing the base member part from the panel to be cleaned by means of blades disposed at an appropriate distance from one another.

A further advantageous embodiment of the invention provides that the blades are made of plastic. Plastic blades of suitable heavy-duty plastics which, in order to achieve a suitable cleaning edge, for example, can be provided with a pitch of 50°-60°, preferably a pitch of 55°, prove to be particularly wear-resistant and less dangerous to handle. In other respects, scratching of the inside to be cleaned can be avoided particularly safely by the use of plastic blades.

Furthermore, it may also be provided preferably in the context of the invention that the different blades are made of different materials, in which case, in particularly advantageous manner, one of the two blades (for example the shorter or the longer blade) can be made of metal and the other blade of plastic. Hereby particularly obstinate soiling adhering firmly to the inside can advantageously be removed particularly thoroughly with the metal blade, whereas light soiling in particular, adhering less firmly to the inside, can be removed relatively neatly by means of the plastic blade.

It is further advantageous when the two blades are attached replaceably and/or by spring mounting to the base member of the cleaning member. If necessary, an inventive cleaning device may even be offered as a set with replacement blades of different materials, thus further enhancing the possible diverse usability of the inventive cleaning device, especially when it comprises at least one shorter blade of metal and one longer blade of plastic.

According to a further preferred embodiment of the invention, it may be provided that the lateral contour of at least one of the two blades tapers (toward the panel) on both sides of the blade by means of a rounded portion merging into the cleaning edge.

The use of appropriately configured blades has the advantage that the cleaning edge of such blades does not extend to the lateral rim of the blade, and so the lateral rim region of the blade is kept apart from the panel to be cleaned by virtue of the rounded portion. Hereby damage to the (silicone) seal on the rim side between the panels of an aquarium adjoining one another at right angles, for example, can be avoided when the blade is being guided laterally along the rim of the panel equipped with the seal. Furthermore, experiments have shown that an inventive cleaning member, which is equipped with blades having such a rounding along the sides of the blades, can be guided hereby even around an inside corner present in an aquarium, in any case when the magnetic force between control member and cleaning member is sufficiently high that magnetic contact between control member and cleaning member is not lost while the control member is being guided around the outside edge of the aquarium.

And, finally, it can also be advantageously provided in the context of the invention that the base member has elongated structure, wherein the blades are disposed at opposite (longitudinal) ends of the base member and are oriented with their blade edges transverse relative to the longitudinal orientation of the base member, and wherein the base member is narrower than the blades in its transverse extent oriented parallel to the blade edges. Such a cleaning member of slender structure has a particularly low flow resistance, whereby the cleaning member can be displaced particularly easily on the inside of the aquarium panel, especially under water.

BRIEF DESCRIPTION OF THE DRAWINGS

An exemplary embodiment of the invention will be explained in more detail hereinafter on the basis of the drawing, wherein.

DETAILED DESCRIPTION OF THE PREFERRED EMBODIMENTS

Figure 1:
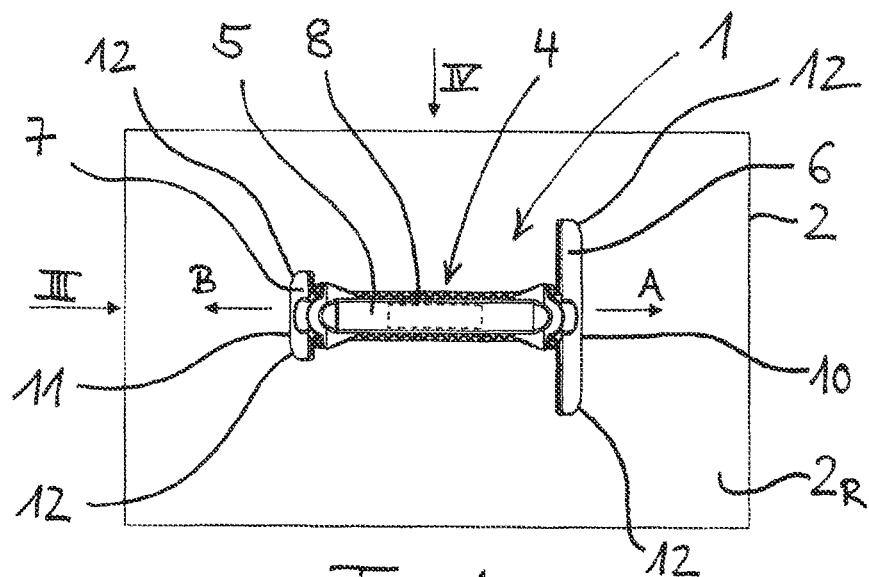
FIG. 1 shows an overhead view of the cleaning member, to be disposed on the back side of the panel, of an exemplary embodiment of an inventive cleaning device.

FIGS. 1 to 4 show different views of an exemplary embodiment of an inventive cleaning device 1 for cleaning back side $2_R$ of a panel 2 with a control member 3 and a cleaning member 4, which is separate from control member 3 and which has a base member 5 and two blades 6, 7 disposed at opposite ends of base member 5 and used for cleaning panel 2.

Figure 2:
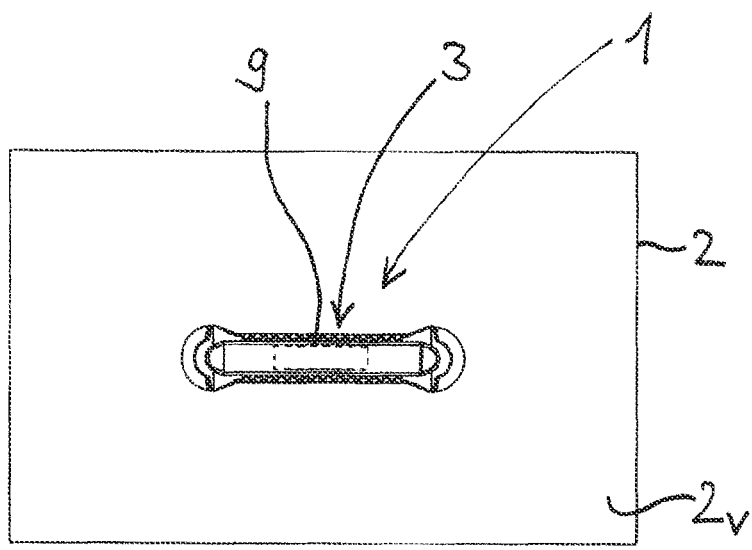
FIG. 2 shows an overhead view of the control member, to be disposed on the front side of the panel, of an exemplary embodiment of an inventive cleaning device.

Magnetic elements 8 and 9, which by virtue of suitable dimensioning generate, between control member 3 and cleaning member 4, a force of attraction through panel 2 that is so strong (if they are disposed to correspond to one another) that cleaning element 4, together with its two blades 6, 7 or their cleaning edges 10, 11, and control member 3 are held against the back side $2_R$ or front side $2_V$ respectively facing them, are built in an arrangement corresponding to one another into the housing, which consists of plastic, for example, of control member 3 and cleaning member 4, as illustrated by dashed lines in FIGS. 1 and 2. When control member 3 is guided manually over front side $2_V$ of the panel, cleaning member 4 can then be moved with its blades 6, 7 of back side $2_R$ of the panel for cleaning purposes.

The elongated configuration of base member 5, which in its transverse extent is even narrower than the shorter of the two blades 6, 7, reduces its flow resistance under water, which is of advantage in particular during use of the inventive cleaning device for cleaning aquarium panels.

By virtue of the largely symmetric arrangement—indicated only by way of example and schematically in FIGS. 1 and 2—of magnetic elements 8, 9 in control member 3 and cleaning member 4, the two blades 6, 7 are pulled with substantially the same force against back side $2_R$ of the panel. However, since blade 7 illustrated at the left in FIG. 1 is much shorter than blade 6 illustrated at the right in FIG. 1 (with correspondingly shorter cleaning edge 11 and correspondingly smaller area of contact with panel 2), shorter blade 7 on back side $2_R$ of the panel to be cleaned—because of the physical relationship: pressure=force/area—exerts a larger pressing force on panel 2 than does longer blade 6. As already explained in the foregoing, this result may be achieved, if necessary as a supplement or alternative, for example, by a suitably asymmetric geometry and/or arrangement of magnetic elements 8, 9 or blades 6, 7.

For (rough) cleaning of the back side $2_R$ of the panel by means of longer blade 6, cleaning member 4 is moved by appropriately guiding control member 3 disposed on the front side of the panel—advantageously according to arrow A toward the right in the orientation shown in FIG. 1—so that long blade 6 is angled obliquely forward and down in the direction of movement. For the best possible cleaning of obstinate soiling from back side $2_R$ of the panel, movement toward the left according to arrow B is advantageously performed in the orientation of the cleaning member shown in FIG. 1, in which case cleaning member 4 obviously can also be turned on panel 2 and/or pushed in its transverse direction by means of control member 3, so that—with suitable orientation and direction of movement respectively—the entire back side $2_R$ of the panel can be freed of soiling with the blade 6, 7 respectively best suited for the purpose.

Figure 3:
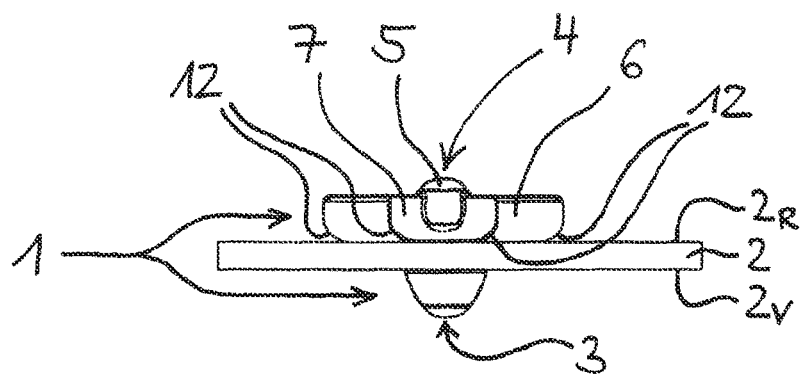
FIG. 3 shows a side view, according to arrow III in FIG. 1, of the exemplary embodiment of an inventive cleaning device illustrated in FIGS. 1 and 2, including panel.

Moreover, it can be readily seen from FIGS. 1 and 3 that the lateral contour of both blades 6, 7 on both sides of the respective blade 6, 7 taper toward the panel by means of a rounded portion 12 merging into the respective cleaning edge 10, 11, whereby it is possible in particular to avoid damage to any seals at inside corners of an aquarium.

Figure 4:
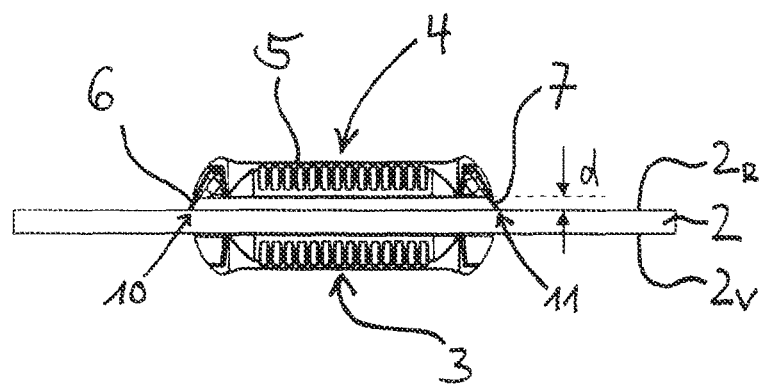
FIG. 4 shows a side view, according to arrow IV in FIG. 1, of the exemplary embodiment of an inventive cleaning device illustrated in FIGS. 1 and 2, including panel.

Finally, it can also be seen in FIG. 4 that base member 5 of cleaning member 4 is advantageously spaced apart by a distance d of at least 3 mm from the panel when cleaning edges 10, 11 of the two blades 6, 7 are bearing on panel 2, and that the two blades 6, 7 are pressed against panel 2 to be cleaned in such a way that their cleaning edges 10, 11 are parallel but respectively angled obliquely down in mutually opposite directions.

What is claimed is:

1. A cleaning device (1) for cleaning the back side ($2_R$) of a panel (2), with
    a control member (3) and
    a cleaning member (4), which is separate from the control member (3) and which has a base member (5) and two blades (6, 7) disposed at opposite ends thereof,
    wherein the control member (3) and the cleaning member (4) can be made to interact magnetically through the panel (2) by means of appropriately disposed magnetic elements (8, 9), so that the cleaning member (4) disposed on the back side ($2_R$) of the panel (2) can be guided along the panel (2) while pressing the cleaning edges (10, 11) of both blades (6, 7) on the back side ($2_R$) of the panel (2) by means of the control member (3) disposed in a manner corresponding to it on the front side ($2_V$) of the panel (2), and
    wherein the two blades (6, 7) are of different lengths and, by suitable geometry and arrangement of the blades (6, 7) and/or of the magnetic elements (8, 9), the shorter (7) of the two blades exerts a greater pressing force on the panel (2) with its cleaning edge (11) than does the longer of the two blades (6).

2. The cleaning device (1) of claim 1, wherein the two blades (6, 7) are disposed on opposite sides of the base member (5) of the cleaning member (4), wherein the two blades (6, 7) are pressed against the panel (2) to be cleaned in such a way that their cleaning edges (10, 11) are parallel but respectively angled in mutually opposite directions.

3. The cleaning device (1) of claim 1, wherein the cleaning edge (11) of the shorter of the two blades (6, 7) forms a smaller area of contact with the panel (2) to be cleaned than does the cleaning edge (12) of the longer of the two blades (6, 7).

4. The cleaning device (1) of claim 1, wherein the base member (5) is spaced apart from the panel by at least 2 mm while the cleaning edges (10, 11) of the two blades (6, 7) are bearing on the panel (2).

5. The cleaning device (1) of claim 1, wherein the blades (6, 7) are made of plastic.

6. The cleaning device (1) of claim 1, wherein one of the blades (6, 7) is made of metal and the other blade (7, 6) of plastic.

7. The cleaning device (1) of claim 1, wherein the two blades (6, 7) are attached replaceably to the base member (5) of the cleaning member (4).

8. The cleaning device (1) of claim 1, wherein the lateral contour of at least one of the two blades (6, 7) tapers on both sides of the blade (6, 7) by means of a rounded portion (12) merging into the cleaning edge (10, 11).

9. The cleaning device (1) of claim 1, wherein the base member (5) has an elongated structure, wherein the blades (6, 7) are disposed at opposite ends of the base member (5) and are oriented with their blade edges (10, 11) transverse relative to the longitudinal orientation of the base member (5), and wherein the base member (5) is narrower than the blades (6, 7) in its transverse extent oriented parallel to the blade edges (10, 11).

* * * * *